(12) United States Patent
Huang

(10) Patent No.: US 12,151,656 B2
(45) Date of Patent: Nov. 26, 2024

(54) SWING TYPE WHEEL LOCKING DEVICE

(71) Applicant: Tzu-Lin Huang, Lukang Township, Changhua County (TW)

(72) Inventor: Tzu-Lin Huang, Lukang Township, Changhua County (TW)

( * ) Notice: Subject to any disclaimer, the term of this patent is extended or adjusted under 35 U.S.C. 154(b) by 334 days.

(21) Appl. No.: 17/691,709

(22) Filed: Mar. 10, 2022

(65) Prior Publication Data
US 2022/0371557 A1 Nov. 24, 2022

(30) Foreign Application Priority Data
May 18, 2021 (TW) .................................. 110117880

(51) Int. Cl.
*B60T 1/00* (2006.01)
(52) U.S. Cl.
CPC .................................. *B60T 1/005* (2013.01)
(58) Field of Classification Search
CPC . B60T 1/005; B60T 7/122; B60T 1/06; B60T 11/105; B60T 7/04; B60T 7/104; B60T 7/08; B62B 5/04; B62B 9/087; B62B 9/082; B62B 5/0433; B62B 9/085; B62B 5/0438; B62B 5/0457; B62B 9/08; B62B 5/048; B62B 5/0414; B62B 5/0419; B62B 2301/0463; B62B 5/0476
See application file for complete search history.

(56) References Cited

U.S. PATENT DOCUMENTS

| 4,400,038 A | * | 8/1983 | Hosokawa | B60B 27/023 |
| | | | | 301/124.2 |
| 4,669,580 A | * | 6/1987 | Neville | B60B 33/0042 |
| | | | | 188/69 |
| 5,314,241 A | * | 5/1994 | Cheng | B60B 37/10 |
| | | | | 301/121 |
| 5,379,866 A | * | 1/1995 | Pearce | A61G 5/101 |
| | | | | 188/69 |
| 5,421,434 A | * | 6/1995 | Liao | A61G 5/1027 |
| | | | | 188/69 |
| 6,120,106 A | * | 9/2000 | Liao | B60B 37/10 |
| | | | | 301/120 |
| 6,149,245 A | * | 11/2000 | Wu | B60B 37/10 |
| | | | | 301/111.06 |

(Continued)

OTHER PUBLICATIONS

EP 366675 A2 (Year: 2018).*
DE 19829723 C2 (Year: 2000).*
CN 206972797 U (Year: 2018).*

*Primary Examiner* — Robert A. Siconolfi
*Assistant Examiner* — Mahbubur Rashid

(57) ABSTRACT

A swing type wheel locking device includes a wheel axle and a pivoting part. A wheel body has an outer wheel face and an axle hole fitted on the periphery of the wheel axle at a position close to the axle end part. A plurality of positioning concave parts are arrayed in a circle on the outer wheel surface. A swing type wheel locking component is pivoted on the wheel axle and has a pivoting end and a swing section. The pivoting end is pivoted on the pivoting part, so that the swing section can be forced to swing, and by choosing different swing angles, it can be shifted between a locked position and released position. When a clamping convex part of the swing section is at a locked position, it is locked right inside the corresponding positioning concave part. Thus, the wheel body is locked against rotation.

8 Claims, 8 Drawing Sheets

(56) References Cited

U.S. PATENT DOCUMENTS

| | | | | |
|---|---|---|---|---|
| 6,189,979 B1* | 2/2001 | Wu | ........................ | B62B 1/042 |
| | | | | 301/121 |
| 6,375,274 B1* | 4/2002 | Morris | .................... | B60B 3/001 |
| | | | | 301/132 |
| 7,445,297 B2* | 11/2008 | Mercier | .................. | B60B 3/142 |
| | | | | 301/121 |
| 8,944,524 B1* | 2/2015 | Sheefel | .................. | B60B 37/10 |
| | | | | 301/111.01 |
| 9,290,048 B2* | 3/2016 | Nolet | ....................... | B60B 37/00 |
| 9,533,530 B2* | 1/2017 | Hartenstine | ......... | B60B 33/0086 |
| 10,378,235 B1* | 8/2019 | Volin | ..................... | E04H 15/46 |
| 2003/0117009 A1* | 6/2003 | Flood | .................... | B60B 37/10 |
| | | | | 301/111.01 |
| 2004/0070262 A1* | 4/2004 | Markling | .................. | B60B 5/02 |
| | | | | 301/120 |
| 2008/0314300 A1* | 12/2008 | Bowsher | ................ | A01C 19/04 |
| | | | | 222/623 |

* cited by examiner

SWING TYPE WHEEL LOCKING DEVICE

CROSS-REFERENCE TO RELATED U.S. APPLICATIONS

Not applicable.

BACKGROUND OF THE INVENTION

1. Field of the Invention

The present invention relates generally to a wheel locking device, and more particularly to an innovative structural design of a swing type wheel locking device.

2. Description of Related Art Including Information Disclosed Under 37 CFR 1.97 and 37 CFR 1.98

The wheel locking device disclosed in the present invention is a device used to stop the rotation of the wheel. Therefore, it can also be called a brake device.

Wheel locking devices commonly seen on the market are widely used in furniture casters or casters for other transportable products. There are different types in the structure of prior-art wheel locking devices, but most of the products have an additional pressing mechanism on the circumference or on the rim of the wheel. This pressing mechanism can be pushed by the user to move so that its pressing part can be pressed tightly on the circumference or on the rim, so that its locking component can lock a preset part of the rim and stop the rotation of the wheel.

However, the structural design of the above-mentioned prior-art wheel locking device is still too complicated, and may not be suitable for some specific wheel body types. To be specific, in most cases, the wheel axle of the prior art casters are fitted on a mouth-shape frame, therefore the wheel locking device has to be configured on the periphery of the wheel body. However, in some product structures (such as a water spray seat), the wheel bodies on both ends are usually fitted in a rotatable manner on the two end portions of the same wheel axle. It is obvious that the aforesaid prior-art wheel locking device is not suitable for direct application on such wheel body structures.

BRIEF SUMMARY OF THE INVENTION

The main object of the present invention is to provide a swing type wheel locking device. The invention aims to make a breakthrough and solve the aforementioned problem by developing a new-type wheel locking device having more practical value.

The present invention provides a technical solution through the features described below. The swing type wheel locking device comprises: a wheel axle, configured in the horizontal direction, wherein, the wheel axle includes an axle end part and a pivoting part is formed at a position of the wheel axle near the axle end part. A wheel body includes an outer wheel face and an axle hole formed at the center of the wheel body, wherein, the axle hole is fitted on the periphery of the wheel axle at a position near the axle end part in a rotatable manner, so that the wheel body is capable of rotation with the wheel axle as the axle center. A plurality of positioning concave parts are arrayed in a circle at intervals on the outer wheel face. A swing type wheel lock component is pivoted on the wheel axle, said swing type wheel lock component including a pivoting end and a swing section connected to each other, wherein, said pivoting end is pivoted on the pivoting part, so that the swing section can be forced to swing, and by choosing different swing angles, it can be shifted between a locked position and released position. Moreover, the swing direction of the swing section and the rotational direction of the wheel body are in an orthogonal relation. Furthermore, the swing section is formed with a clamping convex part. When the clamping convex part of the swing section is at a locked position, it is locked right inside the corresponding positioning concave part. Thus, the wheel body is locked against rotation. The other side of the swing section opposite the clamping convex part is a flat side. When the swing section is at the released position, the flat side is aligned with the outer wheel face, so that the wheel body is in a freely rotatable state.

The main benefits and advantages of the present invention are as follows. Through an easy and simple component, the swing type wheel lock component can lock the wheel against rotation. The component offers a function to limit the wheel body and prevent it from falling off Thus, the structure of the wheel locking device is simplified, and manufacturing and assembly cost reduced. In addition, the operation becomes more convenient. Therefore, the present invention provides practical or economical added values and is truly an inventive step.

Another object of the present invention is to provide a ring groove on the wheel axle at the position corresponding to the pivoting part, so that, when the swing section of the swing type wheel lock component is at the locked position, the pivoting end is meanwhile embedded in the ring groove. Through this additional feature, the swing angle of the swing type wheel lock component can be guided, and the locking position is more accurate. This is another advantage and practical inventive step.

DETAILED DESCRIPTION OF THE INVENTION

Depicted in FIG. 1 to FIG. 5 is a preferred embodiment of a preferred embodiment of the swing type wheel locking device according to the invention. However, such an embodiment is disclosed for the purpose of description only and is not intending to limit the scope of the invention.

Figure 4:
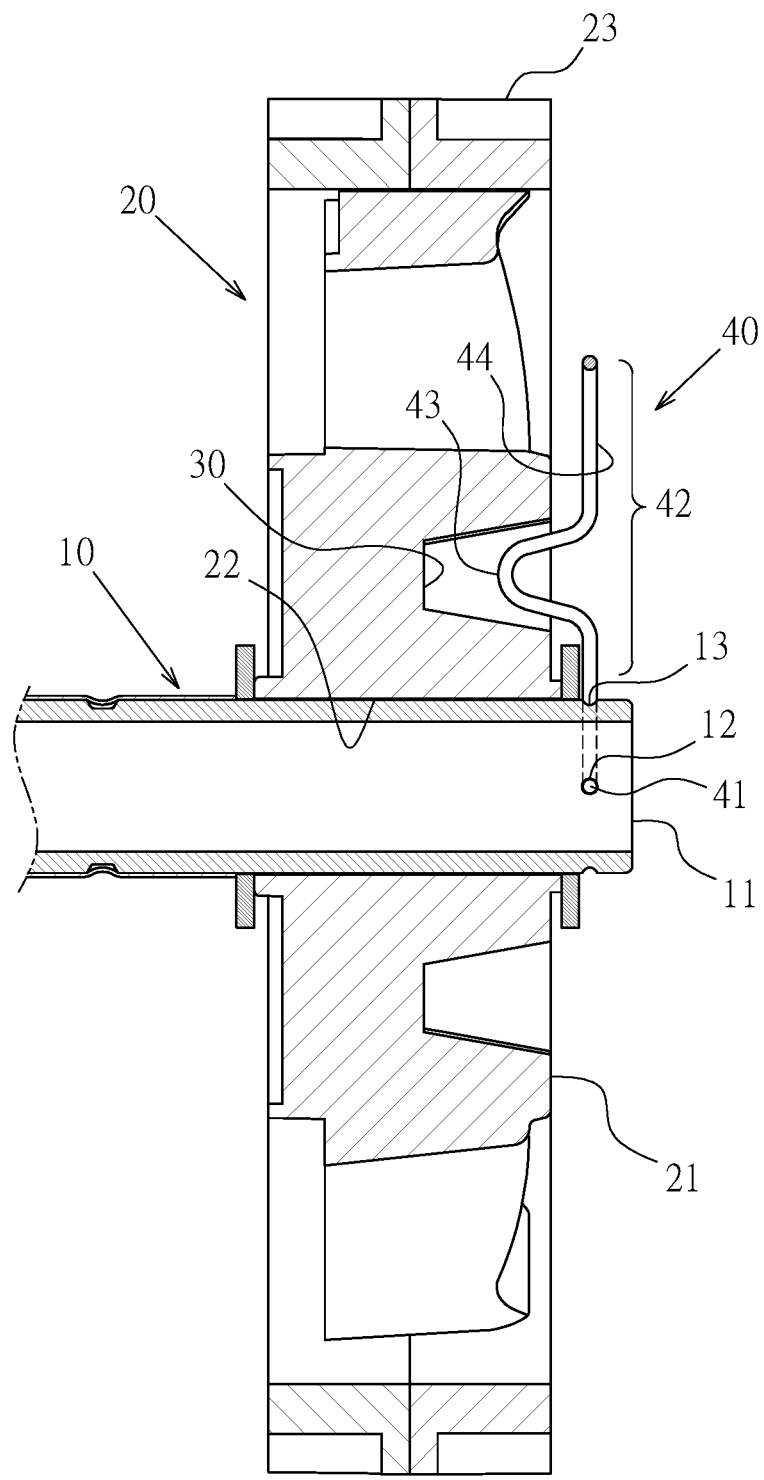
FIG. 4 is a 4-4 sectional view of FIG. 3, meanwhile indicating the swing section is at the locked position.
Figure 6:
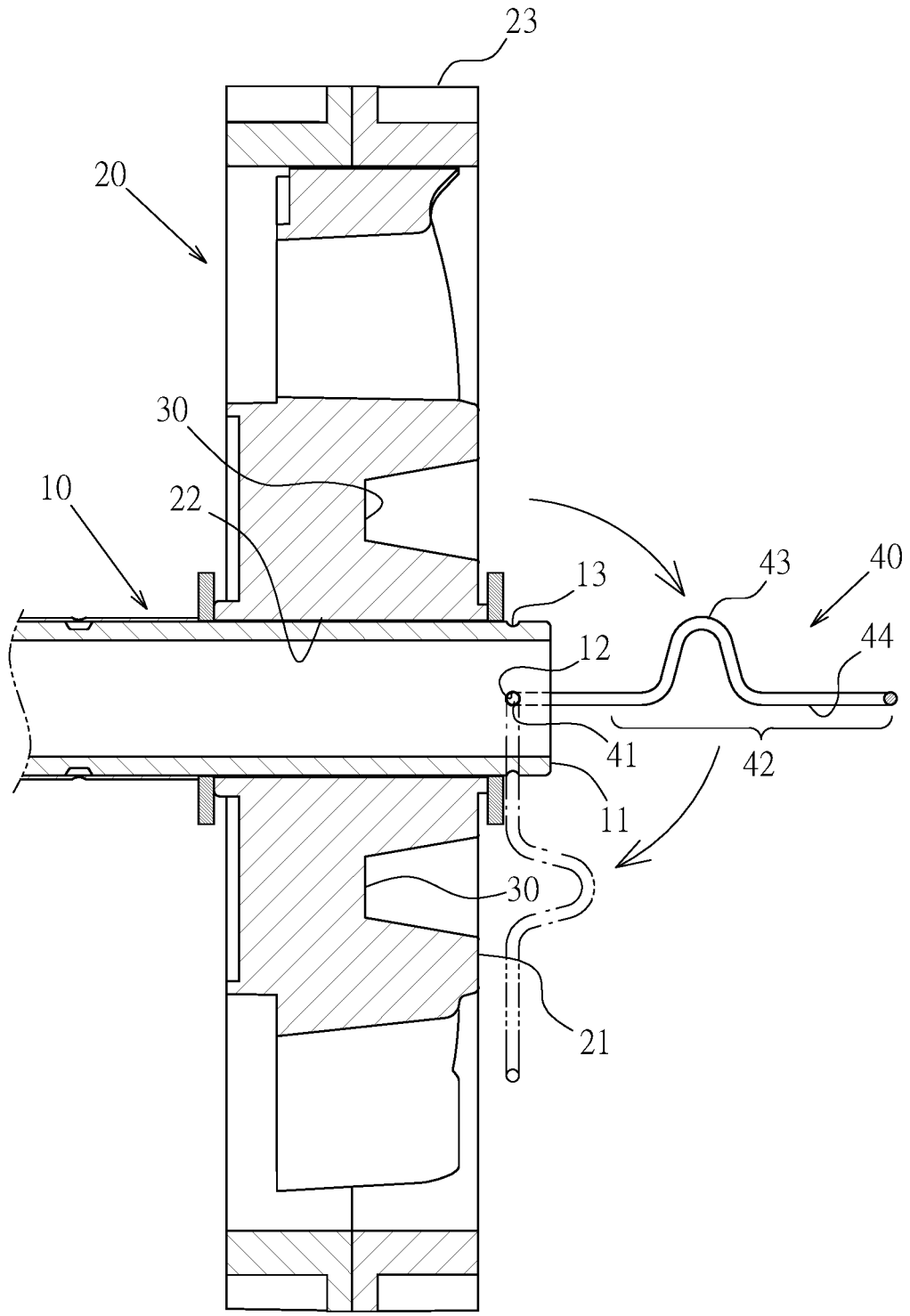
FIG. 6 is a sectional view of the present invention indicating the swing section is at the released position.

The swing type wheel locking device comprises: a wheel axle 10, configured in the horizontal direction, wherein, said wheel axle 10 includes an axle end part 11, and said wheel axle 10 is formed with a pivoting part 12 at the position near the axle end part 11. A wheel body 20 includes an outer wheel face 21 and an axle hole 22 formed at the center of the wheel body 20, wherein said axle hole 22 is fitted on the periphery of the wheel axle 10 at a position near the axle end part 11 in a rotatable manner, so that the wheel body 20 is capable of rotation with the wheel axle 10 as the axle center. A plurality of positioning concave parts 30 are arrayed in a circle at intervals on the outer wheel face 21. A swing type wheel lock component 40 is pivoted on the wheel axle 10. The swing type wheel lock component 40 includes a pivoting end 41 and a swing section 42 connected to each other, wherein said pivoting end 41 is pivoted on the pivoting part 12, so that the swing section 42 can be forced to swing, and by choosing different swing angles, it can be shifted between a locked position (as shown in FIG. 4) and a released position (as shown in FIG. 6). Furthermore, the swing direction of the swing section 42 and the rotational direction of the wheel body 20 are in an orthogonal relation (as the relation indicated by L1 and L2 in FIG. 2). Furthermore, the swing section 42 is formed with a clamping convex part 43. When the swing section 42 is at the locked position, the clamping convex part 43 fits right inside the corresponding positioning concave part 30, so that the wheel body 20 is locked against rotation (i.e., the brake function). The other side of the swing section 42 opposite the clamping convex part 43 is a flat side 44. When the swing section 42 is at the released position, the flat side 44 is aligned with the outer wheel face 21 as disclosed in FIG. 6, so that the wheel body 20 is in a freely rotatable state.

Figure 1:
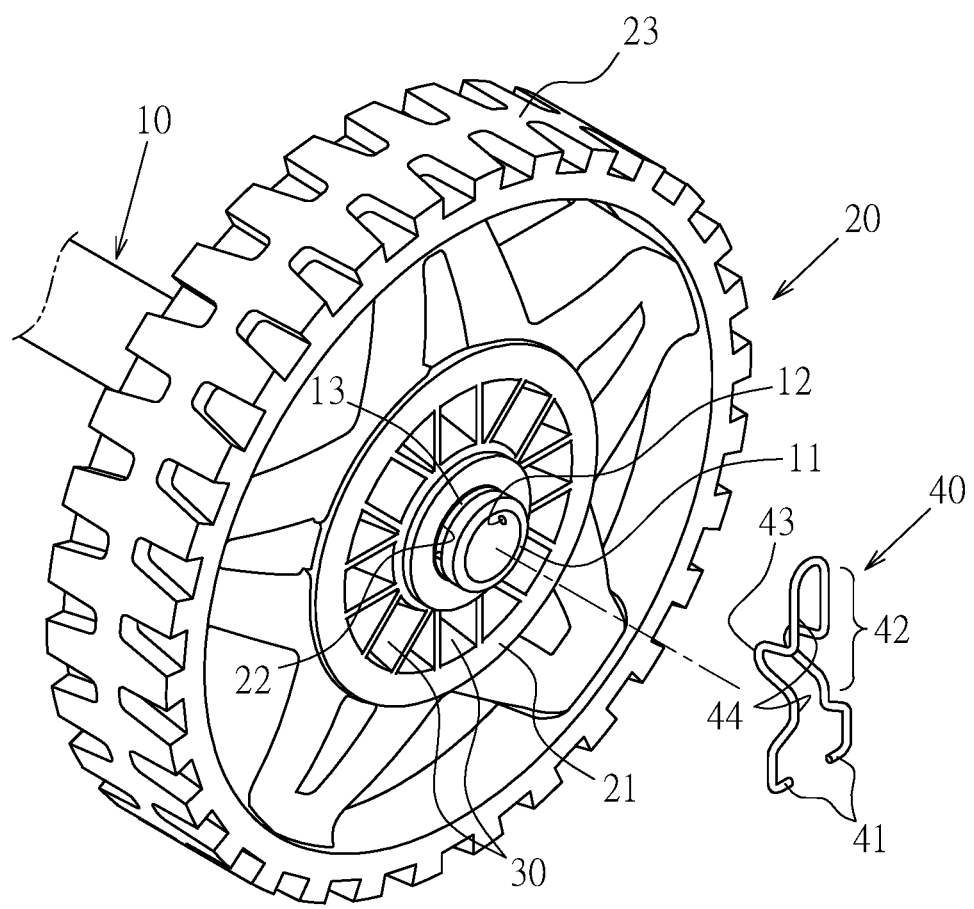
FIG. 1 is an exploded perspective view of part of the components of a preferred embodiment of the present invention.
Figure 2:
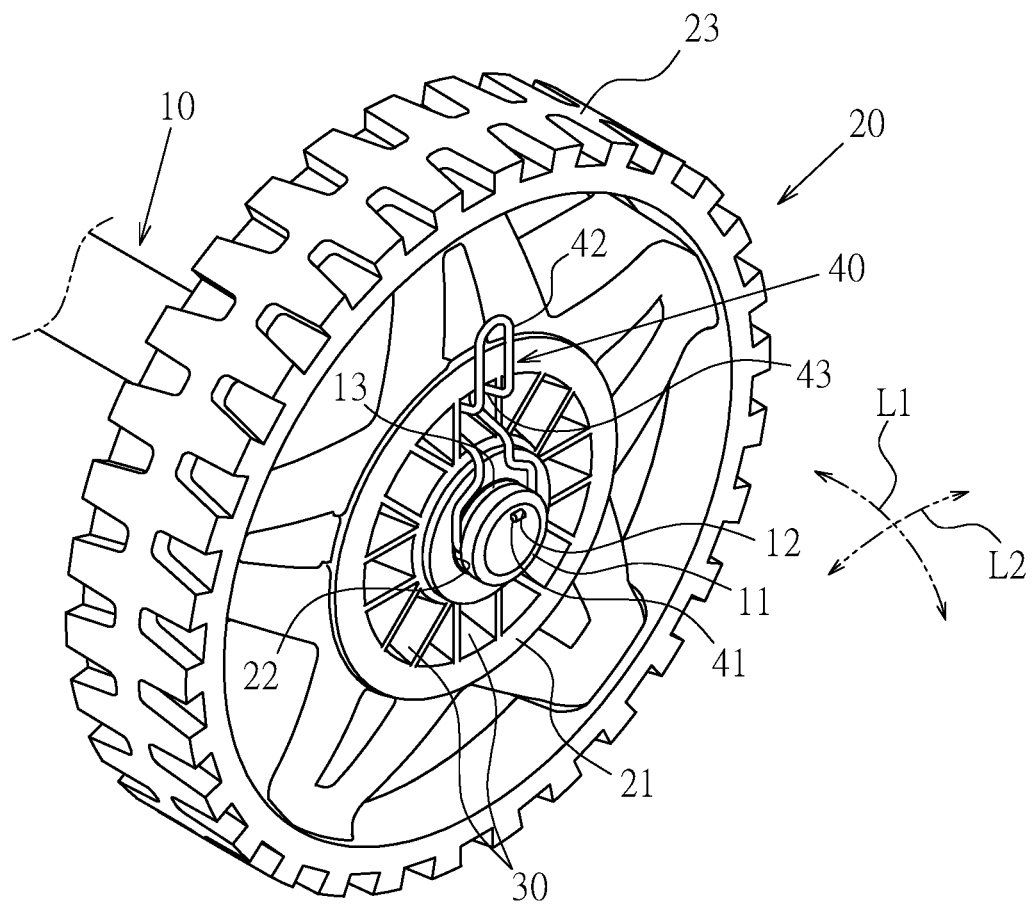
FIG. 2 is a combined perspective view of a preferred embodiment of the present invention.
Figure 3:
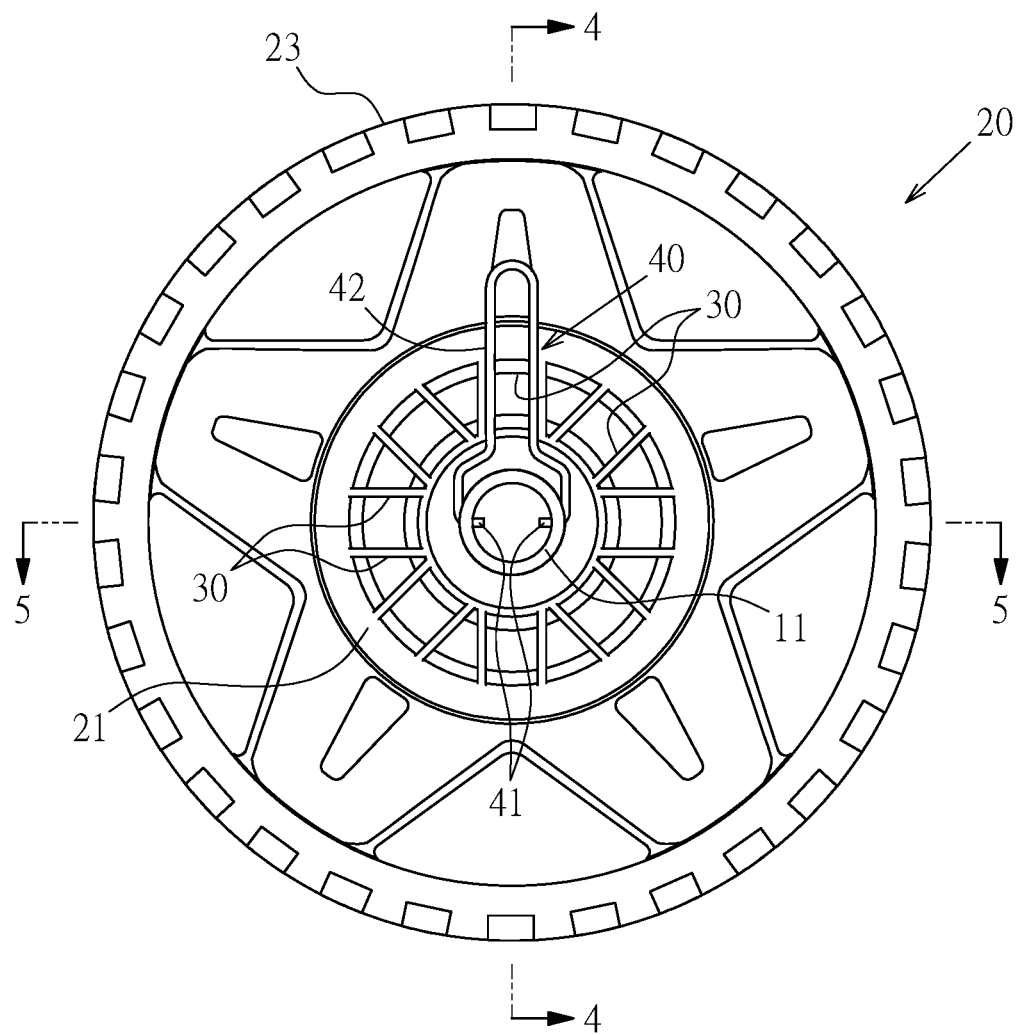
FIG. 3 is a side view of a preferred embodiment of the present invention.
Figure 8:
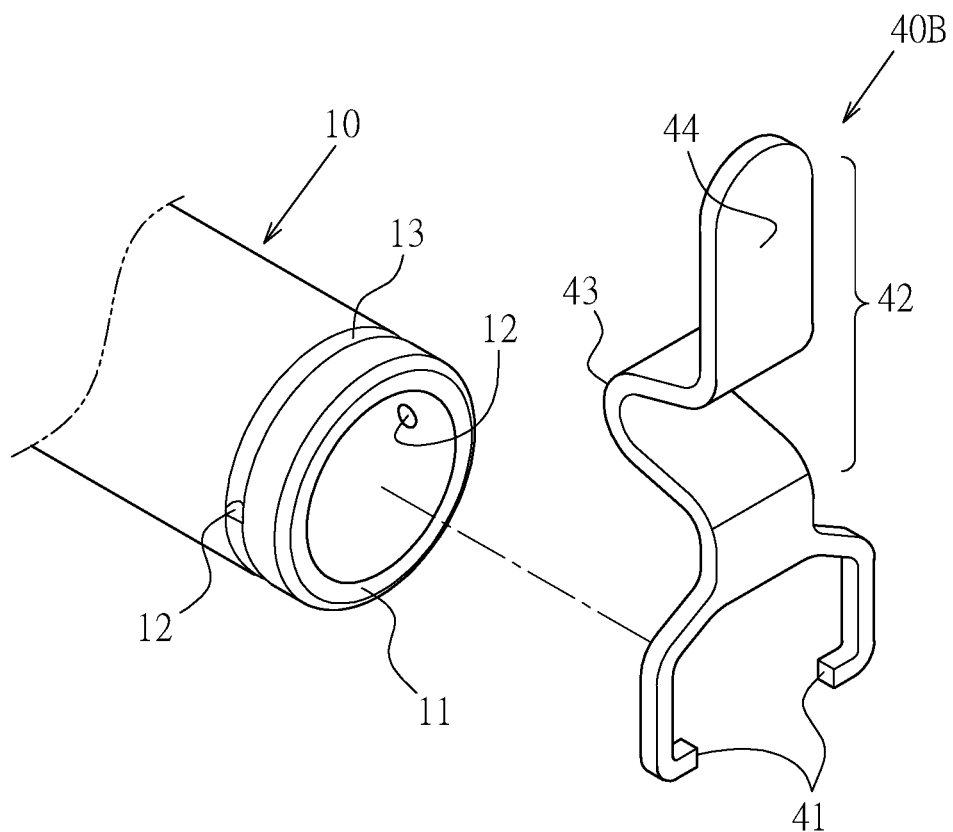
FIG. 8 is a use case diagram showing the swing type wheel lock component of the present invention is formed in the shape of a sheet.

Referring to FIG. 1, in this embodiment, the swing type wheel lock component 40 is shaped by folding a bar. It can also be in a different form, like the swing type wheel lock component 40B disclosed in FIG. 8, which is formed in the shape of a sheet. The material used to make the swing type wheel lock component 40, 40B can be, but not limited to metal or plastic.

Referring to FIG. 1 and FIG. 4, in this embodiment, the pivoting part 12 is in the form of a through hole in the radial direction configured on the wheel axle 10 at a position close to the axle end part 11. The pivoting end 41 of the swing type wheel lock component 40 is correspondingly configured in the form of an axle column. The above design is a preferred embodiment of the actual shapes of the pivoting part 12 and the pivoting end 41. However, it is to be understood by those skilled in the art that the hole/column forms of the two can be interchanged to realize the same function.

Specifically, the positioning concave parts 30 and the wheel body 20 can be structured as an integral body or as detachable modular parts.

Figure 5:
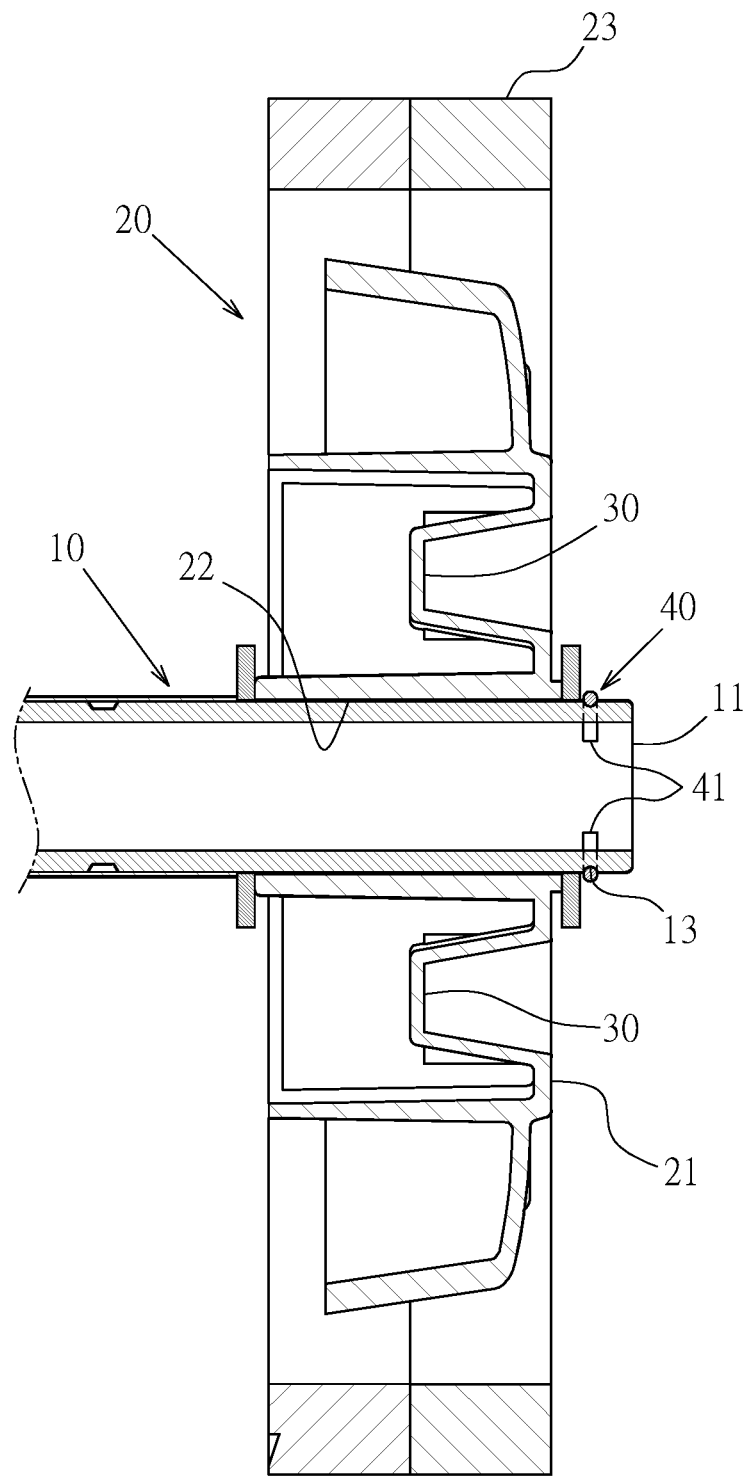
FIG. 5 is a 5-5 sectional view of FIG. 3.

Referring to FIG. 1 and FIG. 5, in this embodiment, the wheel axle 10 is formed with a ring groove 13 (note: preferably its section is arc shaped) at the position corresponding to the pivoting part 12, so that, when the swing section 42 of the swing type wheel lock component 40 is at the locked position, the pivoting end 41 can meanwhile be embedded in the ring groove 13. Thus, the swing angle of the swing type wheel lock component 40 can be guided and the locking position is more accurate.

Referring back to FIG. 1, the wheel body 20 further includes a wheel circumference 23. The wheel circumference 23 is connected on the periphery of the outer wheel face 21 and is shaped as a ring face. The wheel circumference 23 acts as the surface of the wheel body 20 to touch ground. This definition is provided herein to indicate that, as far as the present invention is concerned, the wheel body 20 may include the wheel circumference 23 that touches the ground. However, for some component suppliers, the wheel body 20 may refer to the wheel frame only, and the tyre is a component to be produced by downstream manufacturers and to be assembled to the wheel body.

Figure 7:
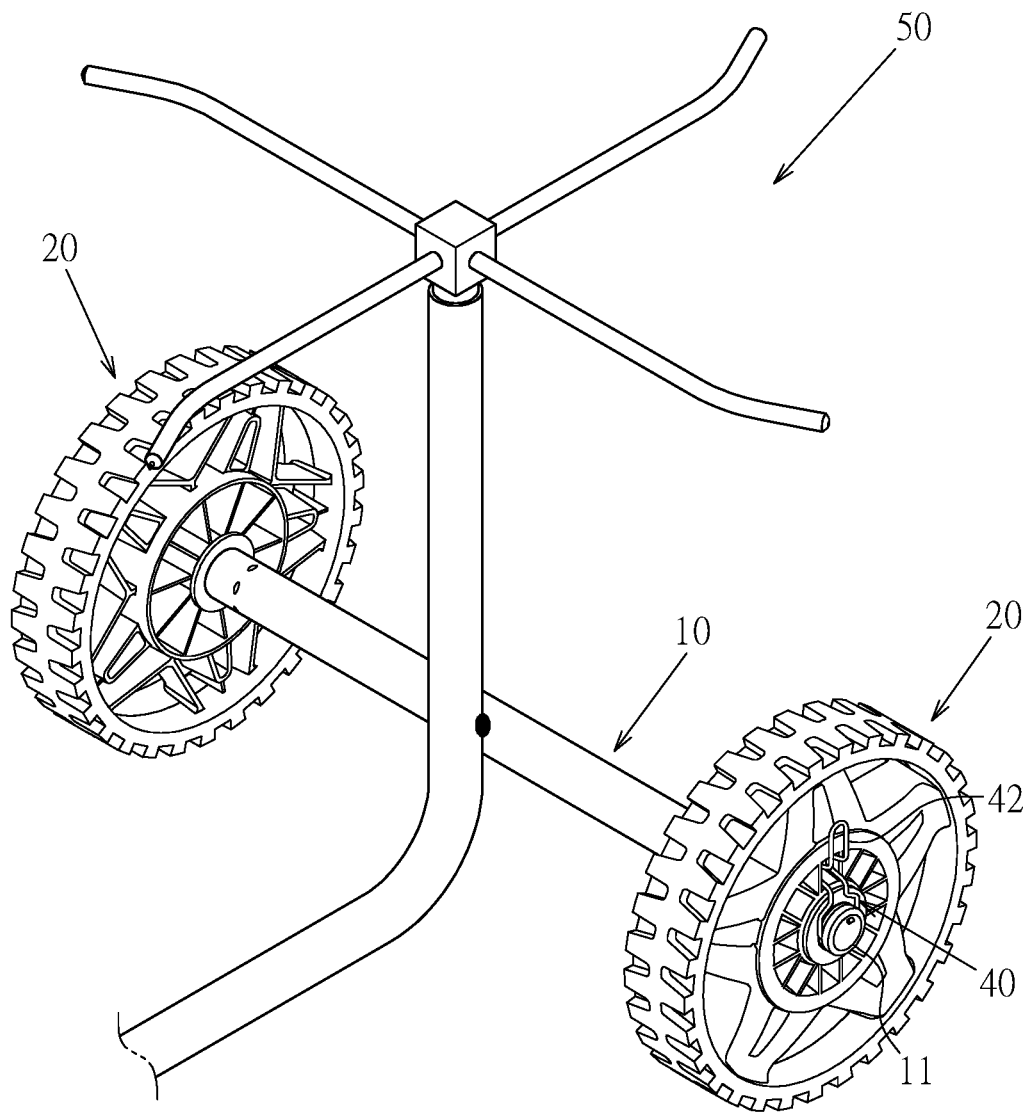
FIG. 7 is a use case diagram showing application of the present invention in a water spray seat.

Based on the aforesaid structural design and technical features, the specific application of the swing type wheel locking device disclosed in the present invention is as depicted in FIG. 7. The application can be, but not limited to the wheel locking device of a mobile water spray seat 50. Because, in this type of mobile water spray seat 50, the wheel bodies 20 on the two sides are usually fitted on the two ends of the same wheel axle 10, application and assembly of the swing type wheel lock component 40 according to the present invention is very suitable. The wheel can be locked against rotation simply by using one single component of the swing type wheel lock component 40. Meanwhile, it can limit the wheel bodies 20 in the axial direction and prevent them from falling off. The invention greatly simplifies the structure of the wheel locking device and reduces the manufacturing and assembly cost. Also, the swing type makes operation very convenient. Obviously, one single component provides double functions. Therefore, the invention truly provides practical and economical values.

I claim:

1. A wheel locking device comprising:
   a wheel axle extending horizontally, said wheel axle having an axle end part, said wheel axle having a pivoting part adjacent the axle end part;
   a wheel body having an outer wheel face and an axle hole, the axle hole formed at a center of said wheel body, said axle hole being rotatably fitted onto a periphery of said wheel axle in a location adjacent the axle end part such that said wheel body is rotatable on the wheel axle;
   a plurality of positioning concave parts arranged in a circle in spaced relation to each other on the outer wheel face;
   a wheel lock component being pivotable on said wheel axle, said wheel lock component having a pivoting end and a swing section connected to each other, wherein the pivoting end pivots on the pivoting part of said wheel axle such that the swing section is urged to swing, the swing section being selective between different swing directions so as to be shiftable between a locked position and a released position, wherein a swing direction of the different swing directions of the swing section and a rotational direction of said wheel body are in orthogonal relation to each other, wherein the swing section has a clamping convex part, the clamping convex part fitting into at least one of the plurality of positioning concave parts when the swing section is in the locked position such that said wheel body is locked against rotation, wherein a side of the swing section opposite the clamping convex part is a flat side, the flat side being aligned with the outer wheel face when the swing section is in the released position such that said wheel body is freely rotatable.

2. The wheel locking device of claim 1, wherein said wheel lock component has a folded bar shape.

3. The wheel locking device of claim 1, wherein said wheel lock component has a sheet shape.

4. The wheel locking device of claim 1, wherein the pivoting part is a through hole form on said wheel axle at a location adjacent the axle end part, wherein the pivoting end of said wheel lock component is of a column form.

5. The wheel locking device of claim 1, wherein said plurality of positioning concave parts and said wheel body have an integral structure.

6. The wheel locking device of claim 1, wherein said plurality of positioning concave parts and said wheel body are detachable modular parts.

7. The wheel locking device of claim 1, wherein said wheel axle has a ring groove in a position corresponding to the pivoting part such that the pivoting end is embedded in the ring groove when the swing section is at the locked position such that the swing direction of said wheel lock component is guidable.

8. The wheel locking device of claim 1, wherein said wheel body has wheel circumference, the wheel circumference being connected to a periphery of the outer wheel face, the wheel circumference being adapted to touch an underlying surface.

\* \* \* \* \*